United States Patent [19]

Shigematsu et al.

[11] Patent Number: 4,923,962
[45] Date of Patent: May 8, 1990

[54] OPTICAL DISK SUBSTRATE COMPRISING AROMATIC POLYCARBONATE

[75] Inventors: Kazuyoshi Shigematsu; Shigenori Shirouzu; Shuji Sakamoto; Toshiyasu Suzuki, all of Chiba, Japan

[73] Assignee: Idemitsu Kosan Co., Ltd., Tokyo, Japan

[21] Appl. No.: 256,643

[22] Filed: Oct. 12, 1988

[30] Foreign Application Priority Data

Oct. 20, 1987 [JP] Japan ................... 62-262850
Feb. 5, 1988 [JP] Japan ................... 63-23657
Feb. 5, 1988 [JP] Japan ................... 63-23658

[51] Int. Cl.$^5$ .................................... C08G 63/62
[52] U.S. Cl. ........................... 528/196; 528/204
[58] Field of Search ..................... 528/196, 204

[56] References Cited

U.S. PATENT DOCUMENTS

| | | | |
|---|---|---|---|
| 3,422,065 | 1/1969 | Wolff et al. | 528/196 |
| 4,465,721 | 8/1984 | McAlister | 528/196 |
| 4,680,374 | 7/1987 | Hasuo et al. | 528/196 |
| 4,734,488 | 3/1988 | Hasuo et al. | 528/196 |

FOREIGN PATENT DOCUMENTS

| | | | |
|---|---|---|---|
| 0249963 | 12/1987 | European Pat. Off. | 528/196 |
| 2186201 | 8/1987 | Japan | 528/196 |

*Primary Examiner*—Harold D. Anderson
*Attorney, Agent, or Firm*—Antonelli, Terry & Wands

[57] ABSTRACT

A resin material for optical instruments comprising a polycarbonate having the repeating units represented by the following general formula:

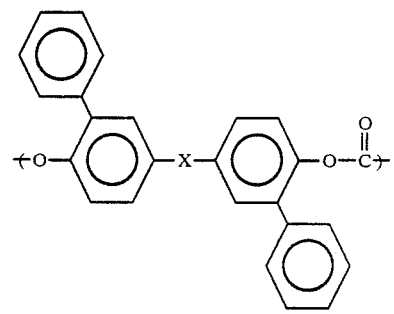

wherein X represents

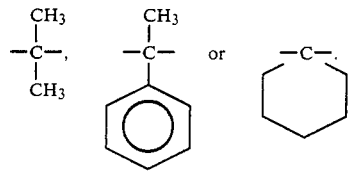

has an extremely small birefringence particularly to oblique-incident lights.

2 Claims, No Drawings

OPTICAL DISK SUBSTRATE COMPRISING AROMATIC POLYCARBONATE

BACKGROUND OF THE INVENTION (1) Field of the Invention

The present invention relates to resin materials for optical instruments, particularly to resin materials for optical instruments which may be suitably used for optical disks such as digital audio disks, digital video disks, and optical memory disks, various kinds of lenses, prisms, mirrors, optical fibers, photoconductive elements, and the like.

(2) Description of the Related Art

Various plastics have been proposed as the resin materials for optical instruments. The properties required of resin materials for optical instruments include heat resistance, low moisture permeability, impact resistance, good optical properties, and the like. As the resin materials satisfying these properties required, for instance, polymethylmethacrylate or polycarbonates made from 2,2-bis(4-hydroxyphenyl)propane have been used. The former however is insufficient in the properties of heat resistance, moisture resistance, and impact resistance. On the other hand, the latter excels in heat-resistance, moisture resistance, impact resistance, etc. but nevertheless have a problem of the large optical distortion thereof causing large birefringence. Large birefringence of a resin material will cause problems that when the resin material is formed into a plate or a sheet and then used as optical disks, the sensitivity of reading the information recorded in the disks will be decreased, or errors in information writing will occur. Particularly, in case of disks wherein optical information is recorded by means of digital signals, for example digital audio disks, digital video disks, and optical memory disks for information read and write, it is required that the optical distortion of the molded products is 20 nm or less in the phase difference. Further, in case of these optical disks, light beam penetrates with narrowing down to the recording film in the disk substrate, and light beam therefore advances obliquely in the substrate. At the time, oblique-incident light beam exhibits a particularly large phase difference and thereby aggravates the occurrence of errors in information read and write.

In Japanese Patent application Laid-open No. 163,007/1985 are disclosed polycarbonates having reduced birefringeces. The polycarbonates however are hardly suitable as materials for optical disks, since even the polycarbonates used in the working examples have still large oblique-incident light birefringent indices. Besides, the specification includes no concrete disclosure suggesting the resin materials for optical instruments of the present invention.

SUMMARY OF THE INVENTION

An object of the present invention is to provide resin materials for optical instruments which not only excel in the transparency, heat resistance, moisture resistance, impact resistance, and surface hardness, but also have extremely small birefringences, particularly, to oblique-incident lights.

Another object of the present invention is to provide resin materials for optical instruments which, when employed for optical disks for information memory such as digital audio disks, digital video disks, and optical memory disks, rarely cause errors in information writing and further, have high sensitivities in reading the recorded informations.

Accordingly, the present invention provides a resin material for optical instruments comprising a polycarbonate having the repeating units represented by the following general formula:

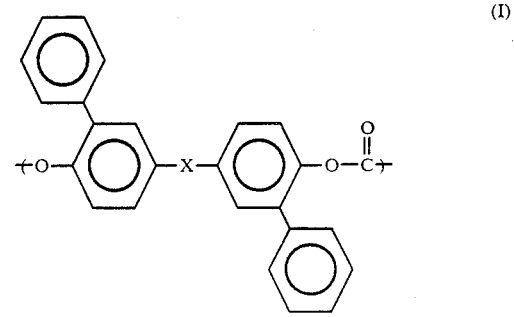

wherein X represents

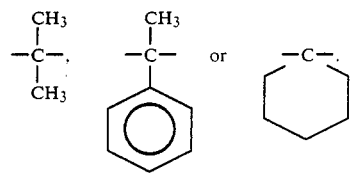

DESCRIPTION OF THE PREFERRED EMBODIMENTS

The polymerization degree of the polycarbonate to be used in the present invention, though it may be properly selected depending upon the kind of the optical instrument, is preferably 12,000 to 25,000 in viscosity average molecular weight calculated in terms of bisphenol A. If the viscosity average molecular weight is less than 12,000. the impact resistance will be sometimes decreased and if it exceeds 25,000, the melt viscosity of the resin will be increased, causing sometimes large optical distortion, i.e. large birefringence, in molds thereof.

The polycarbonates having the repeating units represented by the general formula (I) may be a homopolymer or a copolymer having two or more kinds of repeating units represented by the general formula (I).

Other polycarbonates which may be used in the present invention are copolymers having the repeating units represented by the following general formula:

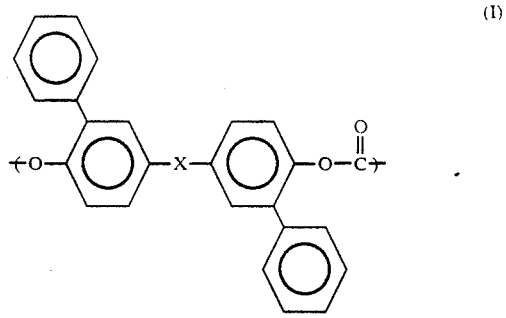

wherein X is as defined above, and the repeating units represented by the following general formula:

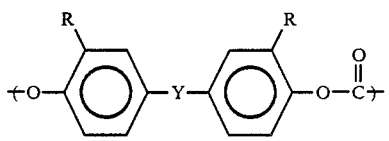
(II)

wherein
Y represents

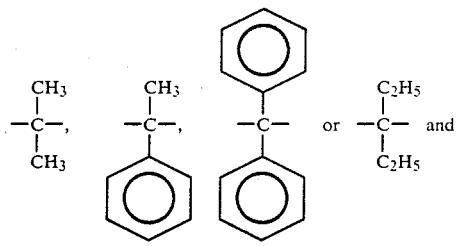

R represents hydrogen atom or —CH₃.

The polycarbonates may contain one or more kinds of the repeating units represented by the general formula (I) and one or more kinds of the repeating units represented by the general formula (II).

Typical examples of the repeating units represented by the general formula (II) include the repeating units represented by the following formula.

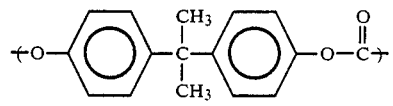

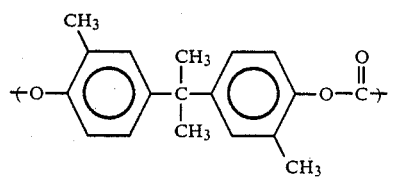

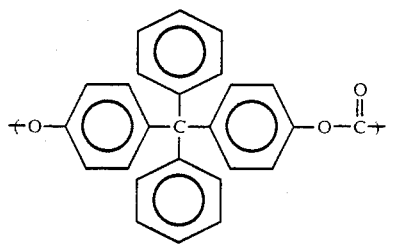

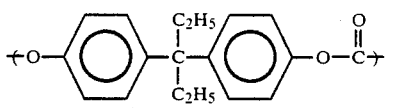

-continued

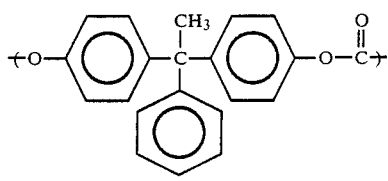

It is preferable that the above-described polycarbonate having the repeating units represented by the general formula (I) and the general formula (II) contains 50 mol% or more of the repeating units represented by the general formula (I). If the mole fraction of the repeating units represented by the general formula (I) is less than 50 mol%. the effect of decreasing the birefringence will sometimes become insufficient.

As the method of preparing the polycarbonates to be used in the present invention, any known method for preparing polycarbonates from bisphenol A may be employed. For example, phosgenation method by the direct reaction of a bisphenol compound with phosgene and transesterification method by the transesterification between a bisphenol compound and a bisaryl carbonate may be employed.

In the former phosgenation method, the polycarbonates having the repeating units represented by the general formula (I) may be prepared by reacting one or more bisphenol compounds selected from the group consisting of 2,2-bis(3-phenyl-4-hydroxyphenyl)propane, 1-phenyl-bis(3-phenyl-4-hydroxyphenyl)ethane, and 1,1-bis(3-phenyl-4-hydroxyphenyl)cyclohexane with phosgene, generally in the presence of an acid acceptor and a solvent. The polycarbonates having the repeating units represented by the general formulas (I) and (II) may be prepared by the same method with the proviso that, in addition to the above-described bisphenol compounds, one or more bisphenol compounds selected from the group consisting of 2,2-bis(4-hydroxyphenyl)propane (bisphenol A), 2,2-bis(3-methyl-4-hydroxyphenyl)propane, 4,4-dihydroxytetraphenylmethane, 3,3-bis(4-hydroxyphenyl)pentane, 1-phenyl-,1,1-bis(4-hydroxyphenyl)ethane, and the like are added.

Some illustrative examples of the acid acceptors which can be used include pyridine and alkaline metal hydroxides such as sodium hydroxide and potassium hydroxide, and the like. Some illustrative examples of the solvents which may be used include methylene chloride, chlorobenzene, xylene, and the like.

It is preferable that a catalyst, for example a tertiary amine such as triethylamine or a quaternary ammonium salt, is used in order to accelerate the polycondensation reaction, and it is also desirable that a molecular weight regulator such as p-tert-butylphenol, phenol, phenylphenols, etc. is used in the reaction in order to control the degree of polymerization. A small quantity of antioxidants such as sodium sulfite, sodium hydrosulfite, etc., may be added as the needs of the case demand.

The reaction is usually carried out at temperatures ranging from 0° to 150° C., preferably from 5° to 40° C. The reaction time is usually from 0.5 minutes to 10 hours, preferably from 1 minute to 2 hours. It is preferable to keep the pH of the reaction system at 10 or higher during the reaction.

On the other hand, in the latter transesterification method, the above-described bisphenol compounds and a bisaryl carbonate are mixed, and the mixture is reacted under a reduced pressure at a high temperature. The reaction is usually carried out at temperatures ranging from 150° to 350° C., preferably from 200° to 300° C., with the pressure of the reaction system being decreased down to 1 mmHg or below toward the final stage of the reaction in order to distill the phenols derived from the bisaryl carbonate away from the reaction system. The reaction time is usually from about 1 to 4 hours. It is preferable to carry out the reaction in an atmosphere of an inert gas such as nitrogen or argon. Additives such as the above-mentioned molecular weight regulators, antioxidants, etc. may be added to the reaction system as the needs of the case demand.

When preparing the copolycarbonates to be used in the present invention, it is also possible to polycondense previously one of the above-described bisphenols with a bisaryl carbonate to obtain an oligomer, and then react the oligomer with other bisphenols.

The polycarbonates of the present invention produced thus are suitable for resin materials for various optical instruments, since when the polycarbonate is molded, the birefringence of the molded product is small and, particularly, the birefringence of oblique-incident light is extremely small in comparison with the molded products from conventional polycarbonate resins. Further, since the resin materials of the present invention as well excel in the transparency heat resistance, moisture resistance, impact resistance, and surface hardness. the optical instruments produced by using the resin materials can stably function under various conditions.

Particularly, the extremely small birefringence of oblique-incident light indicates that when the resin materials of the present invention are used as the substrates of optical disks such as digital audio disks, digital video disks, and disks for information read and write, such disks ensure high sensitivity in reading the information recorded therein resulting in the decrease of errors. The resin materials for optical instruments of the present invention therefore are particularly suitable as resin materials for optical disk substrates.

The method for molding the resin materials of the present invention may be optionally selected from the methods generally employed to mold known polycarbonate resins such as injection molding, compression molding, Rolinx process which is known to be a combination technique of injection molding and compression molding, and micromolding technique.

The desirable molding temperature ranges from 280° to 300° C. If the molding temperature is lower than 280° C., the resin cannot be molten sufficiently, and the resulting insufficient flowability will sometimes cause the optical distortion or problems in the transfer capacity which will be caused by incomplete filling of the resins. If the resin materials are molded at a high temperature higher than 350° C., silver streak or coloration such as yellowing will sometimes occur resulting in the deteriorated transparency of the molded products.

When producing optical instruments by molding the resin material for optical instruments of the present invention, it is also possible to employ a method wherein the resin material of the present invention is previously molded after a small amount of a crosslinking monomer is added therein to increase the flowability, and then the molded product is irradiated with γ-ray, electron beam. X-ray, ultraviolet rays, or the like to cure it by crosslinking.

Further, since the moisture adsorption of the molded products sometimes largely affect the thermostability of the molded products, the surfaces of the molded products may be coated with a resin to decrease the moisture adsorbing property and thereby increase the dimensional stability of the molded products. Some illustrative examples of the methods of resin coating include a method wherein a monomer or prepolymer is coated and then cured by thermal polymerization, radiation polymerization, electron polymerization or the like, a method of blowing a polymer solution, and a method of plasma polymerization. Some illustrative examples of the resins for the surface coating include polymers containing a monomer constituent selected from fluoroalkylenes such as tetrafluoroethylene, organosilanes such as tetramethylsilane, orthosilicates such as tetraethyl orthosilicate, fluoroalkyl methacrylates such as pentafluoroethyl methacrylate, conjugated nitriles such as acrylonitrile, and styrenes such as styrene and chlorostyrenes.

When molding the resin materials for optical instruments of the present invention, at need, general additives for conventional polycarbonates, such as antioxidants, flame retardants, UV absorbers, anti-static agents, lubricants, and colorants, may be blended unless the optical properties of the polycarbonates of the present invention are damaged. More other components, such as phosphites for preventing coloration or deterioration of the transparency, plasticizer for increasing the melt index, may also be added.

Further, other resins may be blended unless the properties of polycarbonates of the present invention are damaged.

In order to more fully and clearly illustrate the present invention, the following examples are presented. It is intended that the examples be considered as illustrative rather than limiting the invention disclosed and claimed herein.

EXAMPLES

PREPARATION EXAMPLE 1

Into a 10-liter flask equipped with baffles were added 600 g of 2,2-bis(3-phenyl-4-hydroxyphenyl)propane, 10 g of p-t-butylphenol as the molecular weight regulator, and 5 liters of methylene chloride and were then dissolved. After the addition of 3 liters of water and 10 ml of triethylamine as the catalyst, phosgene gas was blown in at 3,000 to 4,000 ml/min. at 20° to 30° C. with stirring while keeping the pH of the reaction system over 10 by adding dropwise a 12 N aqueous sodium hydroxide solution. After blowing phosgene gas in for 25 minutes, the mixture was allowed to react for 1 hour at 20° to 25° C. with stirring. After the conclusion of the reaction, the reaction Product was diluted with 7 liters of methylene chloride. washed with successive, water, a 0.01 N aqueous sodium hydroxide solution, water. a 0.01 N aqueous hydrochloric acid, and water, and then introduced into 50 liters of methanol. The polymer precipitated was collected. The amount of the polymer obtained was 640 g. (Yield 97%) The molecular weight of the polymer was 16,500 in the viscosity average molecular weight.

The infrared absorption spectrum of the polymer showed an absorption due to carbonyl radicals at 1650 $cm^{-1}$, and by the results of the $^1H-NMR$ analysis, the polymer was determined to have the repeating units represented by the following formula.

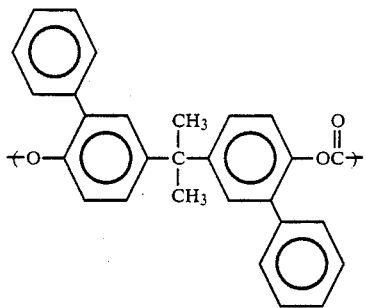

PREPARATION EXAMPLE 2

A copolycarbonate was prepared by repeating the procedure of Preparation Example 1 with the exception that 600 g of 2,2-bis(3-phenyl-4-hydroxyphenyl)propane was replaced with 144 g of 2,2-bis(4-hydroxyphenyl)propane and 360 g of 2.2-bis(3-phenyl-4-hydroxyphenyl)propane. The molecular weight of the copolycarbonate was 14,500 in the viscosity average molecular weight.

The infrared absorption spectrum of the copolymer showed an absorption due to carbonyl radicals at 1650cm$^{-1}$, and by the results of the $^1$H—NMR analysis, the copolymer was determined to have the repeating units represented by the following formulas.

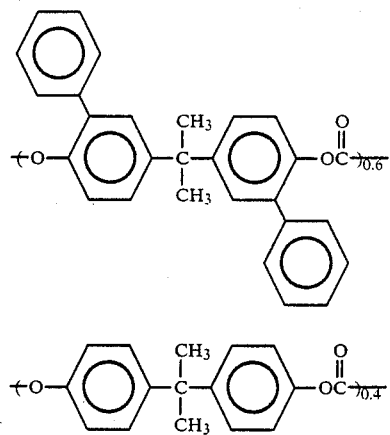

PREPARATION EXAMPLE 3

Into a 10-liter flask equipped with baffles were added 600 g of 1-phenyl-1,1-bis(3-phenyl-4-hydroxyphenyl)ethane, 10 g of p-t-butylphenol as the molecular weight regulator, and 5 liters of methylene chloride and were then dissolved. After the addition of 3 liters of water and 10 ml of triethylamine as the catalyst. phosgene gas was blown in at 3,000 to 4,000 ml/min. at 20° to 30° C. with stirring while keeping the pH of the reaction system over 10 by adding dropwise a 12 N aqueous sodium hydroxide solution. After blowing phosgene gas in for 25 minutes, the mixture was allowed to react for 1 hour at 20° to 25° C. with stirring. After the conclusion of the reaction, the reaction product was diluted with 7 liters of methylene chloride, washed with successive, water, a 0.01 N aqueous sodium hydroxide solution, water, a 0.01 N aqueous hydrochloric acid, and water, and then introduced into 50 liters of methanol. The polymer precipitated was collected. The yield of the polymer was 96%. The molecular weight of the polymer was 15,700 in the viscosity average molecular weight.

The infrared absorption spectrum of the polymer showed an absorption due to carbonyl radicals at 1650 cm$^{-1}$, and by the results of the $^1$H—NMR analysis, the polymer was determined to have the repeating units represented by the following formula.

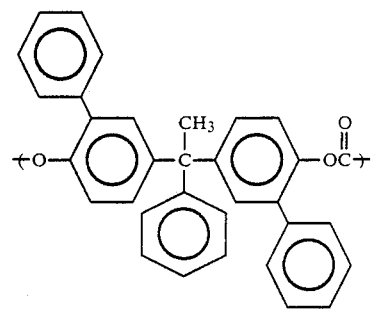

PREPARATION EXAMPLE 4

The procedure of Preparation Example 3 was repeated with the exception that 600 g of 1-phenyl-1,1-bis(3-phenyl-4-hydroxyphenyl)ethane was replaced with 550 g of 1-phenyl-1,1-bis(4-hydroxyphenyl)ethane. The yield of the obtained polymer was 97% and the viscosity average molecular weight was 15,800. By the results of IR analysis and $^1$H—NMR analysis, the polymer was identified to have the repeating units represented by the following formula.

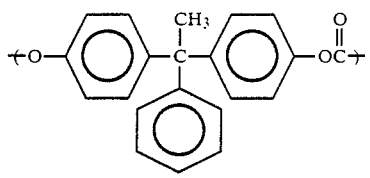

PREPARATION EXAMPLE 5

The procedure of Preparation Example 3 was repeated with the exception that 600 g of 1-phenyl-1,1-bis(3-phenyl-4-hydroxyphenyl)ethane was replaced with 290 g of 1-phenyl-1,1-bis(4-hydroxyphenyl)ethane and 228 g of 2,2-bis(4-hydroxyphenyl)propane. The yield of the obtained copolymer was 97% and the viscosity average molecular weight was 15,600. By the results of IR analysis and $^1$H—NMR analysis, the copolymer was determined to have the repeating units represented by the following formulas.

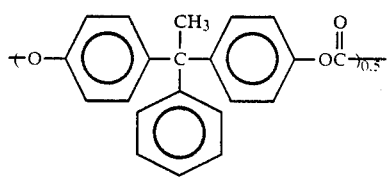

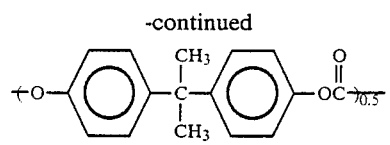

PREPARATION EXAMPLE 6

The procedure of Preparation Example 3 was repeated with the exception that 600 g of 1-phenyl-1,1-bis(3-phenyl-4-hydroxyphenyl)ethane was replaced with 550 g of 1,1-bis(4-hydroxyphenyl)cyclohexane. The yield of the obtained polymer was 98% and the viscosity average molecular weight was 16,200. By the results of IR analysis and $^1$H−NMR analysis, the polymer was determined to have the repeating units represented by the following formula.

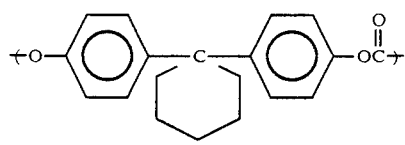

PREPARATION EXAMPLE 7

Into a 10-liter flask equipped with baffles were added 650 g of 1,1-bis(3-phenyl-4-hydroxyphenyl)cyclohexane, 10 g of p-t-butylphenol as the molecular weight regulator, and 5 liters of methylene chloride and were then dissolved. After the addition of 3 liters of water and 10 ml of triethylamine as the catalyst, phosgene gas was blown in at 3,000 to 4,000 ml/min. at 20° to 30° C. with stirring while keeping the pH of the reaction system over 10 by adding dropwise a 12 N aqueous sodium hydroxide solution. After blowing phosgene gas in for 25 minutes, the mixture was allowed to react for 1 hour at 20° to 25° C. with stirring. After the conclusion of the reaction, the reaction product was diluted with 7 liters of methylene chloride, washed with successive, water, a 0.01 N aqueous sodium hydroxide solution, water, a 0.01 N aqueous hydrochloric acid, and water, and then introduced into 50 liters of methanol. The polymer precipitated was collected. The yield of the polymer was 97%. The molecular weight of the polymer was 16,500 in the viscosity average molecular weight.

The infrared absorption spectrum of the polymer showed an absorption due to carbonyl radicals at 1650 cm$^{-1}$, and by the results of the $^1$H−NMR analysis, the polymer was determined to have the repeating units represented by the following formula.

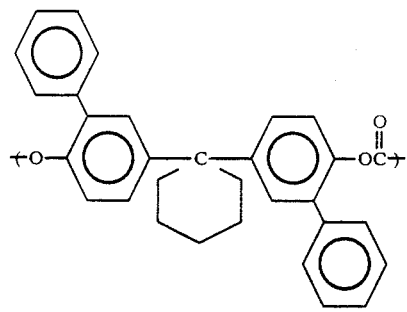

PREPARATION EXAMPLE 8

The procedure of Preparation Example 7 was repeated with the exception that 650g of 1.1-bis(3-phenyl-4-hydroxyphenyl)cyclohexane was replaced with 228 g of 1.1-bis(4-hydroxyphenyl)cyclohexane and 228 g of 2,2-bis(4-hydroxyphenyl)propane. The yield of the obtained copolymer 96% and the viscosity average molecular weight was 15,700. From the results of IR analysis and $^1$H−NMR, the copolymer was identified to have the following repeating units represented by the following formulas.

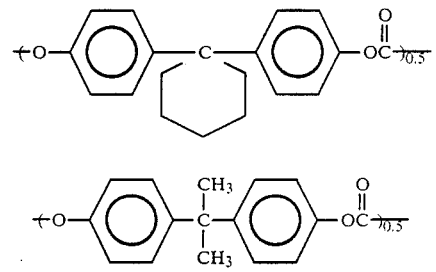

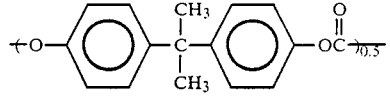

EXAMPLE 1

The polycarbonate obtained in Preparation Example 1 was molded with a molding machine produced by TECHNOPLAS CO., LTD, at a molding temperature of 300° C. to produce a disk of 1.2 mm in thickness and 130 mm in diameter. The birefringence of the disk was measured with an elipsometer. The result is shown in Table 1. The values of some properties of the polycarbonate are shown in Table 2. The measurements of the values of the properties were conducted as follows.

Measurement of the photoelasticity coefficient of melt molded product (C-melt)

When a polymer was melt spun with a capillograph and wound, the stress applied to the string was plotted as abscissa and the birefringence of the string as ordinate and the inclination of the straight line drawn through the plots were defined as C-melt. The C-melt affects the birefringence exhibiting in injection molds and is a fixed number peculiar to the polymer.

Measurement of the water vapor transmission

The water vapor transmission was measured according to JIS-Z-0208 (Dish Method B) under a condition of the temperature of 40° C. and the relative humidity of 90%.

Measurement of the water absorption

The water absorption was measured according to JIS-K-7209 under a condition of the temperature of 23° C. and the time of 24 hours.

Evaluation of the pencil hardness

The pencil hardness was evaluated according to JIS-K-5400.

EXAMPLE 2

The procedure of Example 1 was repeated with the exception that the copolycarbonate obtained in Preparation Example 2 was used as the polycarbonate. The results are shown in Tables 1 and 2.

EXAMPLE 3

The procedure of Example 1 was repeated with the exception that the polycarbonate obtained in Preparation Example 3 was used as the polycarbonate. The results are shown in Tables 1 and 2.

EXAMPLE 4

The procedure of Example 1 was repeated with the exception that the polycarbonate obtained in Preparation Example 7 was used as the polycarbonate. The results are shown in Tables 1 and 2.

COMPARATIVE EXAMPLE 4

The procedure of Example 1 was repeated with the exception that the polycarbonate obtained in Preparation Example 6 was used as the polycarbonate. The results are shown in Tables 1 and 2.

COMPARATIVE EXAMPLE 5

The procedure of Example 1 was repeated with the exception of that the copolycarbonate obtained in Preparation Example 8 was used as the polycarbonate. The results are shown in Tables 1 and 2.

TABLE 1

| | Units | Example 1 | Example 2 | Example 3 | Example 4 | Comparative example 1 | Comparative example 2 | Comparative example 3 | Comparative example 4 | Comparative example 5 |
|---|---|---|---|---|---|---|---|---|---|---|
| Glass transition temperature | °C. | 145 | 146 | 174 | 153 | 148 | 178 | 163 | 171 | 160 |
| Melt viscosity (320° C.) | poise | 160 | 320 | 300 | 180 | 430 | 700 | 570 | 470 | 450 |
| C-melt | $\times 10^{-13}$ cm$^2$/dyne | 1,100 | 2,500 | 1,200 | 500 | 4,400 | 2,300 | 3,400 | 2,300 | 3,400 |
| Light transmittance | % | 88 | 88 | 87 | 87 | 88 | 87 | 88 | 87 | 88 |
| Water vapor transmission | g mm/m$^2$ 24 hr | 2.22 | 3.27 | 1.87 | 0.85 | 4.84 | 2.24 | 3.54 | 1.42 | 3.20 |
| Water absorption (24 hr) | % | 0.08 | 0.11 | 0.07 | 0.05 | 0.16 | 0.10 | 0.13 | 0.06 | 0.11 |
| Pencil hardness | — | H | F | F | F | B | F | HB | F | HB |

TABLE 2

| | Birefringence of vertical-incident light (nm) Double path Distance from the center (mm) | | | | 30° oblique-incident light (nm) Double path Distance from the center (mm) | | | |
|---|---|---|---|---|---|---|---|---|
| | 27 | 38 | 49 | 60 | 27 | 38 | 49 | 60 |
| Example 1 | 4 | 8 | 9 | 10 | 56 | 48 | 50 | 49 |
| Example 2 | 13 | 7 | 3 | 10 | 72 | 68 | 66 | 70 |
| Example 3 | 6 | 5 | 5 | 9 | 58 | 56 | 53 | 49 |
| Example 4 | 5 | 6 | 8 | 9 | 45 | 42 | 43 | 45 |
| Comparative example 1 | −38 | −30 | 25 | 37 | 144 | 132 | 122 | 136 |
| Comparative example 2 | 22 | 21 | 23 | 27 | 98 | 90 | 85 | 101 |
| Comparative example 3 | 25 | 28 | 35 | 38 | 121 | 114 | 105 | 110 |
| Comparative example 4 | 20 | 18 | 16 | 24 | 112 | 103 | 98 | 108 |
| Comparative example 5 | 15 | 21 | 28 | 32 | 125 | 114 | 108 | 112 |

COMPARATIVE EXAMPLE 1

The procedure of Example 1 was repeated with the exception that a polycarbonate prepared from bisphenol A (viscosity average molecular weight: 15,000) was used as the polycarbonate. The results are shown in Tables 1 and 2.

COMPARATIVE EXAMPLE 2

The procedure of Example 1 was repeated with the exception that the polycarbonate obtained in Preparation Example 4 was used as the polycarbonate. The results are shown in Tables 1 and 2.

COMPARATIVE EXAMPLE 3

The procedure of Example 1 was repeated with the exception that the copolycarbonate obtained in Preparation Example 5 was used as the polycarbonate. The results are shown in Tables 1 and 2.

What is claimed is:

1. An optical disk substrate comprising a polycarbonate having the repeating units represented by the following general formula:

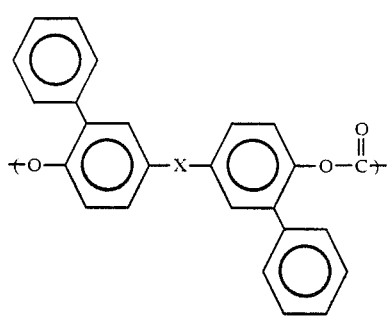

(I)

wherein X represents and having the viscosity average molecular weight of 12,000 to 25,000.

2. An optical disk substrate comprising a copolycarbonate having the repeating units represented by the following general formula:

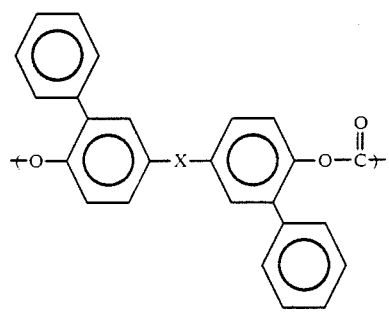

wherein X represents

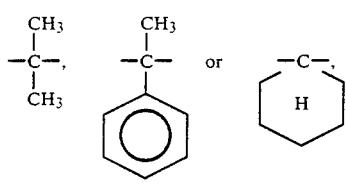

and the repeating units represented by the following general formula:

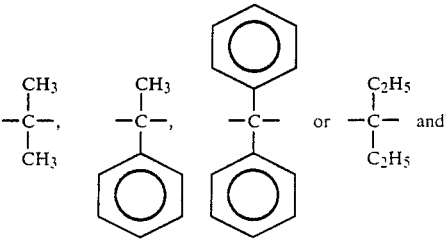

wherein Y represents

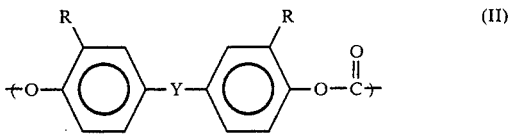

R represents hydrogen atom or —CH$_3$. and containing 50 mol % or more of the repeating units represented by the general formula (I), and further having the viscosity average molecular weight of 12,000 to 25,000.

* * * * *